United States Patent
Patel et al.

(10) Patent No.: US 11,044,313 B2
(45) Date of Patent: Jun. 22, 2021

(54) CATEGORIZING HOST IO LOAD PATTERN AND COMMUNICATING CATEGORIZATION TO STORAGE SYSTEM

(71) Applicant: EMC IP Holding Company LLC, Hopkinton, MA (US)

(72) Inventors: Rimpesh Patel, Bangalore (IN); Arnab Tah, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 16/155,429

(22) Filed: Oct. 9, 2018

(65) Prior Publication Data

US 2020/0112608 A1   Apr. 9, 2020

(51) Int. Cl.
*H04L 29/08* (2006.01)
*H04L 12/863* (2013.01)

(52) U.S. Cl.
CPC ...... *H04L 67/1097* (2013.01); *H04L 47/6255* (2013.01); *H04L 67/1008* (2013.01)

(58) Field of Classification Search
CPC ............. H04L 47/6255; H04L 67/1008; H04L 67/1097; G06F 3/0653; G06F 3/061;
(Continued)

(56) References Cited

U.S. PATENT DOCUMENTS 6,567,397 B1   5/2003 Campana et al.
6,687,746 B1   2/2004 Shuster et al.
(Continued)

FOREIGN PATENT DOCUMENTS

CN   103677927 B   2/2017
EP   1117028 A2   7/2001
(Continued)

OTHER PUBLICATIONS

EMC, "EMC PowerPath and PowerPath/VE Family for Windows," Installation and Administration Guide, Oct. 2018, 102 pages.
(Continued)

*Primary Examiner* — Shean Tokuta
*Assistant Examiner* — Juan C Turriate Gastulo
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device includes a set of input-output queues and a multi-path input-output driver configured to select input-output operations from the set of input-output queues for delivery to the storage system. The multi-path input-output driver is configured to analyze an input-output load pattern of the host device for a predetermined period of time and to categorize the input-output load pattern into one of a plurality of predetermined load pattern categories based at least in part on the analysis. The multi-path input-output driver is configured to transmit information specifying the categorization of the input-output load pattern to the storage system. The storage system is configured to adjust its processing of input-output operations based at least in part on the categorization of the input-output load pattern.

20 Claims, 2 Drawing Sheets

(58) Field of Classification Search
CPC ............ G06F 2206/1012; G06F 3/067; G06F 3/0629; G06F 13/102

See application file for complete search history.

(56) References Cited

U.S. PATENT DOCUMENTS

| | | | |
|---|---|---|---|
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 * | 5/2015 | Davidson | G06F 9/505 710/38 |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,460,136 B1 * | 10/2016 | Todd | G06F 11/3442 |
| 9,594,780 B1 | 3/2017 | Esposito et al. | |
| 9,626,116 B1 * | 4/2017 | Martin | G06F 3/061 |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,243,823 B1 | 3/2019 | Bharadwaj et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,639 B2 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2004/0117369 A1 | 6/2004 | Mandal et al. | |
| 2005/0268145 A1 | 12/2005 | Hufferd et al. | |
| 2006/0026346 A1 | 2/2006 | Kadoiri et al. | |
| 2006/0271639 A1 | 11/2006 | Kumagai et al. | |
| 2006/0277383 A1 | 12/2006 | Hayden et al. | |
| 2007/0168507 A1 | 7/2007 | Das et al. | |
| 2007/0174849 A1 * | 7/2007 | Cheung | G06F 8/656 719/321 |
| 2008/0043973 A1 | 2/2008 | Lai et al. | |
| 2008/0201458 A1 | 8/2008 | Salli | |
| 2008/0250209 A1 * | 10/2008 | Abouelwafa | G06F 12/0862 711/137 |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2011/0314182 A1 * | 12/2011 | Muppirala | G06F 13/00 710/5 |
| 2012/0102369 A1 | 4/2012 | Hiltunen et al. | |
| 2012/0246345 A1 | 9/2012 | Contreras et al. | |
| 2012/0278511 A1 * | 11/2012 | Alatorre | G06F 3/0605 710/33 |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0095445 A1 * | 4/2015 | Thankappan | H04L 67/1097 709/214 |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0291885 A1 | 10/2016 | Pendharkar et al. | |
| 2016/0335003 A1 | 11/2016 | Ahmed et al. | |
| 2017/0180271 A1 | 6/2017 | Wilkinson et al. | |
| 2017/0235503 A1 | 8/2017 | Karr et al. | |
| 2017/0235507 A1 | 8/2017 | Sinha et al. | |
| 2018/0034708 A1 * | 2/2018 | Nakajima | G06F 3/0653 |
| 2018/0189635 A1 | 7/2018 | Olarig et al. | |
| 2018/0253256 A1 * | 9/2018 | Bharadwaj | G06F 3/0644 |
| 2018/0317101 A1 | 11/2018 | Koue | |
| 2019/0056946 A1 * | 2/2019 | Gschwind | G06F 9/30061 |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0073554 A1 * | 3/2020 | Doster | G06F 3/0629 |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

U.S. Appl. No. 16/142,274, filed in the name of Sanjib Mallick et al. Sep. 26, 2018 and entitled "Host Device with Multi-Path Layer Implementing Automatic Standby Setting for Active-Active Configuration."

U.S. Appl. No. 16/145,502, filed in the name of Vinay G. Rao et al. on Sep. 28, 2018 and entitled "Host Device with Multi-Path Layer Implementing Path Selection Based at Least in Part on Fabric Identifiers."

U.S. Appl. No. 16/155,491, filed in the name of Kundan Kumar et al. Oct. 9, 2018 and entitled Migrating Control of a Multi-Path Logical Device from a Current MPIO Driver to a Target MPIO Driver.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

U.S. Appl. No. 15/849,828, filed in the name of Sanjib Mallick et al. Dec. 21, 2017 and entitled "Storage System with Input-Output Performance Control Utilizing Application Process Detection."

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653, filed in the name of Maneesh Pusalkar et al. Oct. 27, 2017 and entitled "Storage System with Network-Wide Configurable Device Names."

(56) References Cited

OTHER PUBLICATIONS

Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
U.S. Appl. No. 16/697,393, filed in the name of Vinay G. Rao et al. Nov. 27, 2019, and entitled "Automated Seamless Migration of Logical Storage Devices."
U.S. Appl. No. 16/710,828, filed in the name of Amit Pundalik Anchi et al. Dec. 11, 2019, and entitled "Automated Seamless Migration with Signature Issue Resolution."

\* cited by examiner

CATEGORIZING HOST IO LOAD PATTERN AND COMMUNICATING CATEGORIZATION TO STORAGE SYSTEM

FIELD

The field relates generally to information processing systems, and more particularly to storage in information processing systems.

BACKGROUND

Storage arrays and other types of storage systems are often shared by multiple host devices over a network. However, problems can arise in such arrangements when the input-output (IO) load patterns from the various host devices change or fluctuate over time which may cause the storage system to experience performance degradations. In some cases, the performance degradations may be related to the storage system not being optimized or calibrated for the particular load patterns exhibited by the host devices. For example, a host device which jumps from a low level of load to a high level of load may not initially receive the best performance from the storage system since the storage system may require a period of time to ramp up or re-calibrate for the higher load. Conventional techniques are unable to adequately detect and alleviate these performance degradations.

SUMMARY

Illustrative embodiments configure a multi-path layer of one or more host devices to include functionality for categorization and prediction of host IO load patterns. The information indicating the categorization and prediction may be transmitted to the storage system for use by the storage system. The multi-path layer illustratively comprises at least one multi-path input-output (MPIO) driver configured to process IO operations of at least one host device. The multi-path layer in such arrangements can be configured to analyze an IO load pattern of the host device for a predetermined period of time and to categorize the IO load pattern into one of a plurality of predetermined load pattern categories based at least in part on the analysis. The multi-path layer in such arrangements can be further configured to transmit information specifying the categorization of the IO load pattern to the storage system. The storage system is configured to adjust its processing of IO operations based at least in part on the categorization of the IO load pattern.

Such embodiments advantageously allow the MPIO driver to minimize or otherwise avoid performance degradations due to fluctuations in the IO load patterns of a host device by providing the storage system with information specifying categorizations of the load patterns that may be used by the storage system to facilitate optimization of the storage system. As a result, improved performance in processing of IO operations is achieved.

In some embodiments, analyzing the load pattern comprises determining an input-output operations per second (IOPS) value of the host device for the predetermined period of time. The categorization of the IO load pattern into the predetermined load pattern category is based at least in part on the determined IOPS value.

In an example embodiment, the categorization of the IO load pattern into the one of the predetermined load pattern categories may comprise comparing the determined IOPS value to a threshold IOPS value associated with the predetermined load pattern category and categorizing the IO load pattern into the one of the predetermined load pattern categories based at least in part on the comparison of the determined IOPS value to the threshold IOPS value.

In an embodiment, the predetermined load pattern category may be one of a plurality of predetermined load pattern categories. Each of the plurality of predetermined load pattern categories may correspond to a range of values associated with a plurality of threshold IOPS values, the plurality of threshold IOPS values including the threshold IOPS value.

In some embodiments, a first predetermined load pattern category of the plurality of predetermined load pattern categories may correspond to IOPS values that are less than a first IOPS threshold value of the plurality of IOPS threshold values, a second predetermined load pattern category of the plurality of predetermined load pattern categories may correspond to IOPS values that are greater than or equal to the first IOPS threshold value and less than a second IOPS threshold value of the plurality of IOPS threshold values, a third predetermined load pattern category of the plurality of predetermined load pattern categories may correspond to IOPS values that are greater than or equal to the second IOPS threshold value and less than a third IOPS threshold value of the plurality of IOPS threshold values, and a fourth predetermined load pattern category of the plurality of predetermined load pattern categories may correspond to IOPS values that are greater than or equal to the third IOPS threshold value. Categorizing the IO load pattern into the one of the predetermined load pattern categories may comprise categorizing the IO load pattern into one of the first, second, third, and fourth predetermined load pattern categories based at least in part on a comparison of the determined IOPS value to at least one of the first, second, third, and fourth threshold IOPS values.

In some exemplary embodiments, the multipath IO driver may be further configured to determine whether or not the categorization of the IO load pattern into the one of the predetermined load pattern categories is a change in categorization from a categorization of a prior IO load pattern of the host device into another of the predetermined load pattern categories where the transmission of the information specifying the categorization of the IO load pattern to the storage system is performed in response to a determination by the multipath IO driver that the categorization of the IO load pattern into the one of the predetermined load pattern categories is a change in categorization from the categorization of the prior IO load pattern of the host device into the another of the predetermined load pattern categories.

In some example embodiments, the one of the predetermined load pattern categories corresponds to a first range of IOPS values of the host device and the another of the predetermined load pattern categories corresponds to a second range of IOPS values of the host device. The first range of IOPS values may be greater than the second range of IOPS values.

In an embodiment, the MPIO driver is configured to transmit the information specifying the categorization of the IO load pattern to the storage periodically.

In an exemplary embodiment, the MPIO driver is configured to obtain information specifying the predetermined period of time from the storage system.

In yet another embodiment, the MPIO driver may be further configured to record instances of respective changes to the load pattern category of the IO load pattern and to identify a pattern of changes to the load pattern category of the IO load pattern over time based at least in part on the on the recorded instances. The MPIO driver may transmit a predictive notification to the storage system, the predictive notification identifying an impending change to the load pattern category of the IO load pattern based at least in part on the identified pattern of changes.

In some example embodiments, the MPIO driver may be further configured to determine whether or not the impending change identified in the predictive notification occurs and to purge the recorded instances of the respective changes in response to a determination that the impending change did not occur as predicted.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
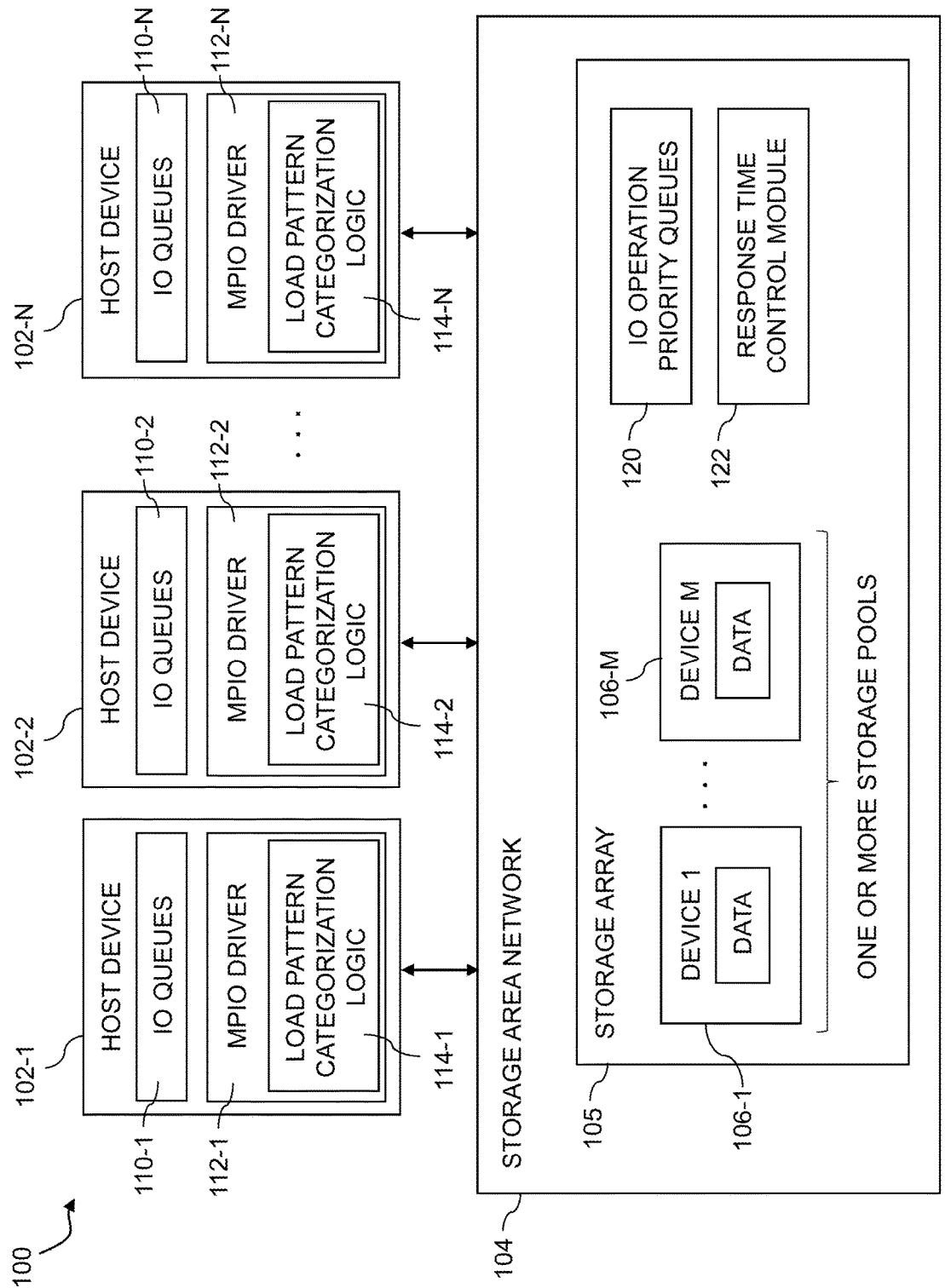
FIG. 1 is a block diagram of an information processing system configured with functionality for categorization and prediction of host IO load patterns utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for categorization and prediction of host IO load patterns and transmission of the categorizations and predictions to the storage system for use by the storage system using respective load pattern categorization logic 114-1, 114-2, . . . 114-N implemented within the MPIO drivers 112.

MPIO drivers typically group all paths from a host to a logical unit number (LUN) into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

The MPIO drivers described herein may comprise, for example, otherwise conventional MPIO drivers, such as PowerPath drivers from Dell EMC, suitably modified in the manner disclosed herein to implement functionality for categorization and prediction of host IO load patterns. Other types of MPIO drivers from other driver vendors may be suitably modified to incorporate functionality for categorization and prediction of host IO load patterns as disclosed herein.

The multi-path layer comprising MPIO drivers supports multiple paths between each of the host devices 102 and the storage array 105. These paths are illustratively associated with respective initiator-target pairs, with each initiator comprising a host bus adaptor (HBA) or other initiating entity of a given host device such as the host device 102-1 and each target comprising a port or other targeted entity corresponding to one or more of the storage devices 106 of the storage array 105. As noted above, the storage devices 106 illustratively comprise LUNs or other types of logical storage devices.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, a MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers 112 collectively comprise a multi-path layer of the host devices 102. The MPIO drivers 112 provide functionality for categorization and prediction of host IO load patterns, for example, using respective load pattern categorization logic 114-1, 114-2, ... 114-N implemented within the MPIO drivers 112.

Existing host IO stack software like MPIO drivers typically perform IO load balancing but do not communicate with the storage devices 106 such as, e.g., a storage array or back end storage system, about IO load patterns.

In some embodiments, host IO load patterns may be categorized in threshold-based categories such as, e.g., low, medium, high, extreme high (burst), or other similar categories and information indicating these categories may be communicated back to the storage devices 106 for use by the storage devices 106 in processing IO operations. For example, the processing of IO operations by the storage devices 106 may be optimized or configured to handle the incoming IO load pattern.

In some embodiments, a predictive analysis of the host IO load patterns may be performed to determine if any of the host IO load patterns are repetitive, for example, on specific time-intervals. Information regarding the predictive analysis may also be provided to the storage devices 106 for use by the storage device 106 in processing IO operations. For example, the processing of IO operations by the storage devices 106 may be optimized or configured to handle the predicted incoming IO load pattern. As an example, a host device 102 may exhibit an extreme high (burst) IO load pattern every-day at 11:30 PM as a daily database backup is initiated. Knowledge of the reoccurring nature of this host IO load pattern may be useful to the storage devices 106 when preparing to process incoming IO operations from the host device or from other host devices. For example, in some embodiments, a categorization of a host IO load pattern may be communicated to the storage devices 106 along with actual and predictive load patterns. In some embodiments, this information may assist the storage devices 106 in preparing to process the incoming IO load or to calibrate the storage devices 106 for optimal performance based at least in part on the information.

In some embodiments, the IO load patterns, both actual and predictive, may be categorized in threshold-based categories. For example, at the multipathing layer, received IO operations are load balanced across any number of eligible paths to the storage devices 106. The multipathing layer is aware of information including whether the IO operations are read or write operations, the b count (read/write transfer count) of the received IO operations, and whether the IO operations or a buffer of the IO operations are chained together. In some embodiments, for example, an IO request may include more than one buffer with each buffer being chained together, e.g., using a linked list. Each buffer in the chain may be treated as a separate IO request for the purposes of determining IOPS.

In some embodiments, threshold values for categorization of the IO load pattern may be set or determined during an initial host-array handshake. For example, in some embodiments, the storage array may provide the threshold values for each category to the multipath layer. In some embodiments, threshold values for categorization of the IO load pattern may be pre-determined, for example, based on default parameters. In some embodiments, the threshold values for categorization may be input by a user or administrator of the system.

As an example, IOPS threshold values may comprise a first IOPS threshold value L1, a second IOPS threshold value L2, and a third IOPS threshold value L3. IO load pattern categorizations may be based on threshold values L1, L2, and L3 where, for example, a low IO load pattern may be any IO load pattern having an IOPS<L1, a medium IO load pattern may be any IO load pattern having an IOPS greater than or equal to L1 but less than L2 (L1≤IOPS<L2), a high IO load pattern may be any IO load pattern having an IOPS greater than or equal to L2 but less than L3 (L2≤IOPS<L3), and an extreme high (burst) IO load pattern may be any IO load pattern having an IOPS greater than or equal to L3 (L3≤IOPS). Any number of threshold values and categories may be used. As a non-limiting illustrative example, in some embodiments, threshold value L1 may be 80,000 IOPS, threshold value L2 may be 160,000 IOPS, and threshold value L3 may be 256,000 IOPS. Any other values for the threshold values may be used.

In some embodiments, the information indicating the categorization of the IO load pattern may be provided to the SAN 104 by the host device 102 periodically. In some embodiments, the SAN 104 or some portion thereof may actively check a variable or other parameter of the host device 102 periodically to obtain the information indicating the categorization of the IO load pattern. For example, in some embodiments, the information indicating the categorization of the IO load pattern may be provided to SAN 104 by the host device 102 every five seconds. Any other period of time may be used. In some embodiments, the period of time may be predetermined. In some embodiments, the period of time may be input by a user or administrator of the system.

In some embodiments, the information indicating the categorization of the IO load pattern may be provided to the SAN 104 from the host 102 after a change in a categorization of the IO load pattern.

For example, in some embodiments, the information indicating the categorization of the IO load pattern may be transmitted or otherwise provided to the SAN 104 from the host device 102 in response to any change in categorization of the IO load pattern.

In some embodiments, the information indicating the categorization of the IO load pattern may be transmitted or otherwise provided to the SAN 104 from the host device 102 in response to predetermined types of changes in categorization of the IO load pattern.

For example, in some embodiments, the information indicating the categorization of the IO load pattern may be transmitted or otherwise provided to the SAN 104 from the host device 102 in response to the categorization of the IO load pattern changing to the extreme high (burst) IO load pattern, in response to the categorization of the IO load pattern changing to the high IO load pattern, in response to the categorization of the IO load pattern changing to the medium IO load pattern, in response to the categorization of the IO load pattern changing to the low IO load pattern, or in response to the categorization of the IO load pattern exhibiting any other predetermined type of change.

In some embodiments, for example, the information indicating the categorization of the IO load pattern may be transmitted or otherwise provided to the SAN 104 from the host device 102 in response to the categorization of the IO load pattern increasing, e.g., changing from a lower IO load pattern category to a higher IO load pattern category such as, e.g., from low to medium, low to high, low to extreme high (burst), medium to high, medium to extreme high (burst), high to extreme high (burst), or other similar types of changes in the categorization.

In some embodiments, for example, the information indicating the categorization of the IO load pattern may be transmitted or otherwise provided to the SAN 104 from the host device 102 in response to the categorization of the IO load pattern decreasing, e.g., changing from a higher IO load pattern category to a lower IO load pattern category such as, e.g., from extreme high (burst) to high, extreme high (burst) to medium, extreme high (burst) to low, high to medium, high to low, medium to low, or other similar types of changes in the categorization.

In some embodiments, the criteria for transmitting the information indicating the categorization of the IO load pattern may be obtained from a user or administrator of host device 102 or SAN 104.

In some embodiments, the IO load pattern may be determined over a predetermined period of time or time interval, for example, by determining the average load for categorization, e.g., in IOPS. As an example, the predetermined period of time may be in seconds, milliseconds, nanoseconds, or any other period of time, e.g., 3 seconds. In some embodiments, the predetermined period of time may be obtained from a user or administrator of the host device 102 or SAN 104. In some embodiments, the predetermined period of time may have a default value that is obtained on startup of the host device 102 or SAN 104.

In some embodiments, the multipathing layer may perform the IO load pattern categorization in a daemon context, e.g., separate from the actual IO path of the IO operations. The multipathing layer may perform the IO load pattern analysis over the predetermined period of time or time interval and may calculate the average IO load for that sample duration for one or more of the reads, writes, and total (combined reads and writes) of the IO operations being balanced on the host device 102 by the multipathing layer. In some embodiments, for example, if reads are the most relevant IO for the SAN 104, the IOPS value associated with the reads over the predetermined period of time may be used to determine the category for the IO load pattern to be provided to the SAN 104. Likewise, if writes are the most relevant IO for the SAN 104, the IOPS value associated with the writes over the predetermined period of time may be used to determine the category for the IO load pattern to be provided to the SAN 104. If the total of both the reads and the writes is the most relevant IO for the SAN 104, the IOPS value associated with the total over the predetermined period of time may be used to determine the category for the IO load pattern to be provided to the SAN 104.

The information indicating the categorization of the IO load pattern may be transmitted or otherwise provided to SAN 104 from host device 102 using any command specific to the storage system including, for example, vendor specific SCSI commands or any alternative provided or implemented by the vendor of the host device 102 or SAN 104.

Predictive analysis may be performed by load pattern categorization logic 114 over a period of time such as, e.g., an hour, a day, a week, a month, or other period of time. In some embodiments, predictive analysis may be performed by load pattern categorization logic 114 to detect patterns in the category changes of the IO load pattern of the host device 102. For example, if the category of the IO load pattern of a host device 102 changes to a particular category in a predictable interval, such as, e.g., every day at 10:00 PM, load pattern categorization logic 114 may provide that pattern to the SAN 104 for optimization where SAN 104 may be optimized to expect that change in category at that time on the next day.

In some embodiments, for example, load pattern categorization logic 114 may record the time instances when the category of the IO load pattern for a host device 102 has changed and may log this information for later use. As another example, load pattern categorization logic 114 may record the time instances when the category of the IO load pattern for the host device 102 has changed to a particular category, e.g., extreme High (burst), within a particular period of time such as, e.g., a day. Having identified and logged the change in category, load pattern categorization logic 114 may sample the next N time periods, e.g., the next two days, to determine whether the change re-occurs in a predictable pattern, e.g., at the same time on the next day, at the same time every other day, etc. If load pattern categorization logic 114 confirms that the change re-occurs in a predictable pattern, load pattern categorization logic 114 may transmit or otherwise provide a predictive notification in advance of the predicted change, e.g., 1 hour or another amount of time, to SAN 104. The predictive notification may indicate to the SAN 104 that a category change in the IO load pattern for the host 102 is predicted for a target time. SAN 104 may then be optimized to handle the IO operations associated with the predicted category change. If the predicted category change does not occur as expected at or near the target time, the log and samples associated with the predicted category change that were collected by load pattern categorization logic 114 may be purged and load pattern categorization logic 114 may continue collecting logs and samples in order to predict further category changes using subsequent predictive analysis.

In this manner the IO load patterns associated with a host device 102 may be categorized and predicted and SAN 104 may be made aware of categorizations and predictions for optimization of the IO operations.

Illustrative embodiments of the techniques and functionality of load pattern categorization logic 114 will now be described in more detail with reference to FIG. 2.

Figure 2:
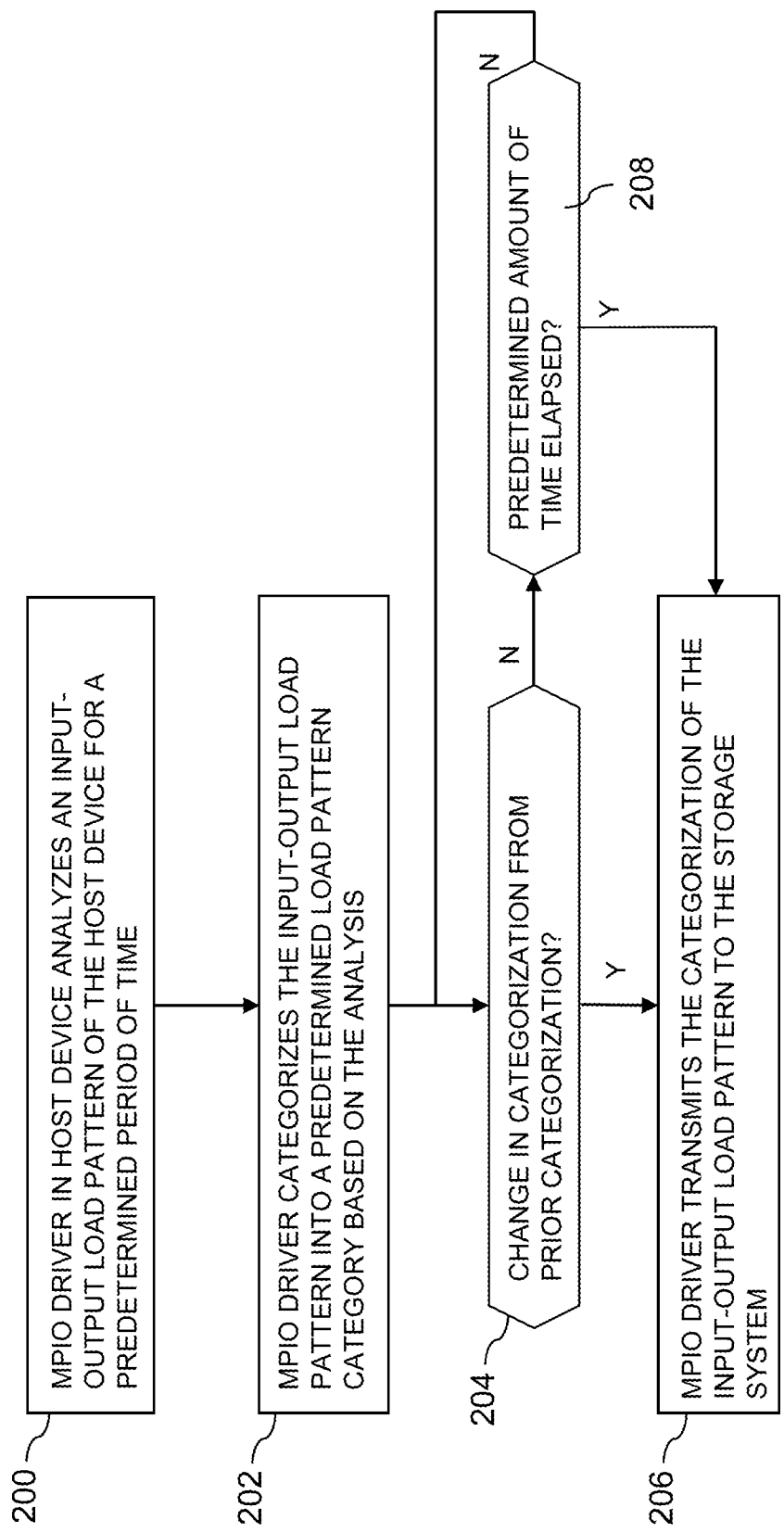
FIG. 2 is a flow diagram showing one possible example of the categorization of host IO load patterns utilizing a multi-path layer of a host device in an illustrative embodiment.

The process as shown in FIG. 2 includes steps 200 through 208, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes.

At 200, the load pattern categorization logic 114 of MPIO driver 112 analyzes an IO load pattern of the host device 102 for a predetermined period of time.

At 202, the load pattern categorization logic 114 categorizes the IO load pattern into one of a plurality of predetermined load pattern categories based at least in part on the analysis, for example, in the manner described above. For example, the load pattern categorization logic 114 may categorize the IO load pattern based on a comparison of the IOPS of the IO load pattern for the predetermined period of time to threshold values, e.g., L1, L2, L3, etc., into a category such as, e.g., low, medium, high, extreme high (burst), or any other categorization of the IO load pattern.

At 204, load pattern categorization logic 114 determines whether any change in the categorization from a prior categorization has occurred. For example, if the prior categorization of the IO load pattern for a host 102 was low and the new categorization of the IO load pattern for the host 102 is high, a change in categorization for the IO load pattern of the host 102 has occurred.

At 206, if a change has occurred, load pattern categorization logic 114 transmits or otherwise provides information indicating the categorization of the IO load pattern of the host 102 to the SAN 104. For example, the information indicating the categorization may be transmitted using a SCSI command.

At 208, if a change has not occurred, load pattern categorization logic 114 determines whether a predetermined amount of time has elapsed. If the predetermined amount of time has not elapsed, the method returns to step 204 to determine whether a change has occurred. If the predetermined amount of time has elapsed, the method proceeds to step 206 and transmits or otherwise provides information indicating the categorization of the IO load pattern of the host 102 to the SAN 104. For example, if the IO load pattern was medium, the new IO load pattern is medium, and the predetermined amount of time has elapsed, information indicating that the IO load pattern is medium may be transmitted or otherwise provided to the SAN 104 at 206.

Functionality such as that described in conjunction with the flow diagram of FIG. 2 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

Numerous alternative arrangements of these and other features can be used in implementing the FIG. 2 process and other illustrative embodiments.

The illustrative embodiments disclosed herein can provide a number of significant advantages relative to conventional arrangements. For example, some embodiments configure a multi-path layer of one or more host devices to include functionality for load pattern categorization and prediction that may be provided to an associated storage array or other type of storage system.

The above-described functions associated with functionality for load pattern categorization and prediction are carried out at least in part under the control of load pattern categorization logic 114. For example, load pattern categorization logic 114 is illustratively configured to control performance of portions of the process shown in the flow diagram to be described above in conjunction with FIG. 2.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104, and to perform the disclosed functionality for load pattern categorization and prediction. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support load pattern categorization and prediction.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for IO load pattern categorization and prediction as disclosed herein, many storage systems may not be optimized for the IO load patterns of incoming IO operations. This leads to inefficiencies in the storage system as well as in the host devices that share that storage system.

Such drawbacks are advantageously overcome in illustrative embodiments herein by utilization of load pattern categorization logic 114 to implement functionality for IO load pattern categorization and prediction, as described herein.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 122 and IO operation priority queues 120, illustratively configured to make use of the above-described persistent memory. For example, the response time control module 122 may be used to implement storage array-based adjustments in response time for particular IO operations based at least in part on service level objective (SLO) information stored by the storage array 105 in its persistent memory. The response time control module 122 operates in conjunction with the IO operation priority queues 120.

The storage array 105 utilizes its IO operation priority queues 120 to provide different levels of performance for IO operations. For example, the IO operation priority queues 120 may have respective different priority levels. The storage array 105 may be configured to provide different priority levels for different ones of the IO operations by assigning different ones of the IO operations to different ones of the IO operation priority queues 120. The IO operation priority queues 120 are illustratively associated with respective SLOs for processing of IO operations in the storage array 105.

Process tags may be used in assigning different ones of the IO operations to different ones of the IO operation priority queues 120, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS)

and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support the categorization and prediction of IO load patterns, as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and load pattern categorization logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the load pattern categorization logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, load pattern categorization logic and additional or alternative components. Also, the particular configurations of system and device elements and associated processing operations illustratively shown in the drawings can be varied in other embodiments. For example, a wide variety of different MPIO driver configurations and associated load pattern categorization arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
a set of input-output queues; and
a multi-path input-output driver configured to select input-output operations from the set of input-output queues for delivery to the storage system over the network,
wherein the multi-path input-output driver is further configured:

to analyze an input-output load pattern of the host device based at least in part on a submission of a plurality of input-output operations to the storage system by the host device over a predetermined period of time;

to categorize the input-output load pattern into one of a plurality of predetermined load pattern categories based at least in part on the analysis;

to determine that the categorization of the input-output load pattern into the one of the predetermined load pattern categories is a change in categorization from a categorization of a prior input-output load pattern of the host device into another of the predetermined load pattern categories; and based at least in part on determining that the categorization of the input-output load pattern into the one of the predetermined load pattern categories is a change in categorization from the categorization of the prior input-output load pattern into the another of the predetermined load pattern categories, to transmit information specifying the categorization of the input-output load pattern into the one of the plurality of predetermined load pattern categories to the storage system, the storage system being configured to adjust its processing of input-output operations based at least in part on the categorization of the input-output load pattern into the one of the plurality of predetermined load pattern categories.

2. The apparatus of claim 1, further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1,
wherein analyzing the load pattern comprises determining an input-output operations per second (IOPS) value of the host device for the predetermined period of time, and
wherein the categorization of the input-output load pattern into the one of the predetermined load pattern categories is based at least in part on the determined IOPS value.

4. The apparatus of claim 3, wherein the categorization of the input-output load pattern into the one of the predetermined load pattern categories comprises:
comparing the determined IOPS value to a threshold IOPS value associated with the predetermined load pattern category; and
categorizing the input-output load pattern into the one of the predetermined load pattern categories based at least in part on the comparison of the determined IOPS value to the threshold IOPS value.

5. The apparatus of claim 4, wherein each of the plurality of predetermined load pattern categories corresponds to a range of values associated with a plurality of threshold IOPS values, the plurality of threshold TOPS values including the threshold TOPS value.

6. The apparatus of claim 5,
wherein a first predetermined load pattern category of the plurality of predetermined load pattern categories corresponds to TOPS values that are less than a first IOPS threshold value of the plurality of TOPS threshold values, wherein a second predetermined load pattern category of the plurality of predetermined load pattern categories corresponds to TOPS values that are greater than or equal to the first TOPS threshold value and less than a second IOPS threshold value of the plurality of IOPS threshold values, wherein a third predetermined load pattern category of the plurality of predetermined load pattern categories corresponds to IOPS values that are greater than or equal to the second TOPS threshold value and less than a third IOPS threshold value of the plurality of IOPS threshold values, wherein a fourth predetermined load pattern category of the plurality of predetermined load pattern categories corresponds to IOPS values that are greater than or equal to the third TOPS threshold value, and wherein categorizing the input-output load pattern into the one of the predetermined load pattern categories comprises categorizing the input-output load pattern into one of the first, second, third, and fourth predetermined load pattern categories based at least in part on a comparison of the determined IOPS value to at least one of the first, second, third, and fourth threshold TOPS values.

7. The apparatus of claim 1, wherein the one of the predetermined load pattern categories corresponds to a first range of input-output operations per second (TOPS) values of the host device and the another of the predetermined load pattern categories corresponds to a second range of IOPS values of the host device, the first range of IOPS values being greater than the second range of TOPS values.

8. The apparatus of claim 1, wherein the multipath input-output driver is configured to transmit the information specifying the categorization of the input-output load pattern into the one of the plurality of predetermined load pattern categories to the storage system periodically.

9. The apparatus of claim 1, wherein multipath input-output driver is configured to obtain information specifying the predetermined period of time from the storage system.

10. The apparatus of claim 1, wherein the multi-path input-output driver is further configured:
to record instances of respective changes to the load pattern category of the input-output load pattern;
to identify a pattern of changes to the load pattern category of the input-output load pattern over time based at least in part on the on the recorded instances; and
to transmit a predictive notification to the storage system, the predictive notification identifying an impending change to the load pattern category of the input-output load pattern based at least in part on the identified pattern of changes.

11. The apparatus of claim 10, wherein the multi-path input-output driver is further configured:
to determine whether or not the impending change identified in the predictive notification occurs; and
to purge the recorded instances of the respective changes in response to a determination that the impending change did not occur as predicted.

12. A method comprising:
configuring a multi-path input-output driver of a host device to select input-output operations from a set of input-output queues of the host device for delivery to a storage system over a network;
wherein the multi-path input-output driver performs the following steps:

analyzing an input-output load pattern of the host device based at least in part on a submission of a plurality of input-output operations to the storage system by the host device over a predetermined period of time;

categorizing the input-output load pattern into one of a plurality of predetermined load pattern categories based at least in part on the analysis;

determining that the categorization of the input-output load pattern into the one of the predetermined load pattern categories is a change in categorization from a categorization of a prior input-output load pattern of the host device into another of the predetermined load pattern categories; and based at least in part on determining that the categorization of the input-output load pattern into the one of the predetermined load pattern categories is a change in categorization from the categorization of the prior input-output load pattern into the another of the predetermined load pattern categories, transmitting information specifying the categorization of the input-output load pattern into the one of the plurality of predetermined load pattern categories to the storage system, the storage system being configured to adjust its processing of input-output operations based at least in part on the categorization of the input-output load pattern into the one of the plurality of predetermined load pattern categories.

13. The method of claim 12,
wherein analyzing the load pattern comprises determining an input-output operations per second (IOPS) value of the host device for the predetermined period of time, and
wherein the categorization of the input-output load pattern into the one of the predetermined load pattern categories comprises:
  comparing the determined TOPS value to a threshold IOPS value associated with the predetermined load pattern category; and
  categorizing the input-output load pattern into the one of the predetermined load pattern categories based at least in part on the comparison of the determined TOPS value to the threshold TOPS value.

14. The method of claim 12, wherein the method further comprises:
  recording instances of respective changes to the load pattern category of the input-output load pattern;
  identifying a pattern of changes to the load pattern category of the input-output load pattern over time based at least in part on the on the recorded instances; and
  transmitting a predictive notification to the storage system, the predictive notification identifying an impending change to the load pattern category of the input-output load pattern based at least in part on the identified pattern of changes.

15. A computer program product comprising a non-transitory processor-readable storage medium having stored therein program code of one or more software programs, wherein the program code, when executed by a host device comprising a multi-path input-output driver and a set of input-output queues, the host device being configured to communicate over a network with a storage system, causes the multi-path input-output driver:
  to analyze an input-output load pattern of the host device based at least in part on a submission of a plurality of input-output operations to the storage system by the host device over a predetermined period of time;
  to categorize the input-output load pattern into one of a plurality of predetermined load pattern categories based at least in part on the analysis;
  to determine that the categorization of the input-output load pattern into the one of the predetermined load pattern categories is a change in categorization from a categorization of a prior input-output load pattern of the host device into another of the predetermined load pattern categories; and
  based at least in part on determining that the categorization of the input-output load pattern into the one of the predetermined load pattern categories is a change in categorization from the categorization of the prior input-output load pattern into the another of the predetermined load pattern categories, to transmit information specifying the categorization of the input-output load pattern into the one of the plurality of predetermined load pattern categories to the storage system, the storage system being configured to adjust its processing of input-output operations based at least in part on the categorization of the input-output load pattern into the one of the plurality of predetermined load pattern categories.

16. The computer program product of claim 15,
wherein analyzing the load pattern comprises determining an input-output operations per second (IOPS) value of the host device for the predetermined period of time, and
wherein the categorization of the input-output load pattern into the one of the predetermined load pattern categories comprises:
  comparing the determined TOPS value to a threshold IOPS value associated with the predetermined load pattern category; and
  categorizing the input-output load pattern into the one of the predetermined load pattern categories based at least in part on the comparison of the determined TOPS value to the threshold TOPS value.

17. The computer program product of claim 15, wherein program code further causes the multi-path input-output driver:
  to record instances of respective changes to the load pattern category of the input-output load pattern;
  to identify a pattern of changes to the load pattern category of the input-output load pattern over time based at least in part on the on the recorded instances; and
  to transmit a predictive notification to the storage system, the predictive notification identifying an impending change to the load pattern category of the input-output load pattern based at least in part on the identified pattern of changes.

18. The apparatus of claim 1, wherein:
the multi-path input-output driver is further configured:
  based at least in part on determining that the categorization of the input-output load pattern into the one of the predetermined load pattern categories is a change in categorization from the categorization of the prior input-output load pattern of the host device into another of the predetermined load pattern categories, to monitor the input-output load patterns of the host device periodically for a predetermined period of time; and
  to determine, based at least in part on the monitoring, that the change in categorization from the another of the predetermined load pattern categories to the one of the predetermined load pattern categories repeats according to a pattern; and the information specifying the categorization of the input-output load pattern into the one of the plurality of predetermined load pattern categories is transmitted to the storage system in advance of a next repeat of the change according to the pattern based at least in part on the determination that the change in the categorization from the another of the predetermined load pattern categories to the one of the predetermined load pattern categories repeats according to the pattern.

19. The method of claim 12, wherein:

the method further comprises:

based at least in part on determining that the categorization of the input-output load pattern into the one of the predetermined load pattern categories is a change in categorization from the categorization of the prior input-output load pattern of the host device into another of the predetermined load pattern categories, monitoring the input-output load patterns of the host device periodically for a predetermined period of time; and determining, based at least in part on the monitoring, that the change in categorization from the another of the predetermined load pattern categories to the one of the predetermined load pattern categories repeats according to a pattern; and the information specifying the categorization of the input-output load pattern into the one of the plurality of predetermined load pattern categories is transmitted to the storage system in advance of a next repeat of the change according to the pattern based at least in part on the determination that the change in the categorization from the another of the predetermined load pattern categories to the one of the predetermined load pattern categories repeats according to the pattern.

20. The computer program product of claim 15, wherein:

program code further causes the multi-path input-output driver:

based at least in part on determining that the categorization of the input-output load pattern into the one of the predetermined load pattern categories is a change in categorization from the categorization of the prior input-output load pattern of the host device into another of the predetermined load pattern categories, to monitor the input-output load patterns of the host device periodically for a predetermined period of time; and to determine, based at least in part on the monitoring, that the change in categorization from the another of the predetermined load pattern categories to the one of the predetermined load pattern categories repeats according to a pattern; and the information specifying the categorization of the input-output load pattern into the one of the plurality of predetermined load pattern categories is transmitted to the storage system in advance of a next repeat of the change according to the pattern based at least in part on the determination that the change in the categorization from the another of the predetermined load pattern categories to the one of the predetermined load pattern categories repeats according to the pattern.

* * * * *